(12) United States Patent  
Yamashiro

(10) Patent No.: US 12,489,177 B2  
(45) Date of Patent: Dec. 2, 2025

(54) POWER SUPPLY DEVICE, ELECTRIC VEHICLE USING SAME, AND POWER STORAGE DEVICE

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 663 days.

(21) Appl. No.: 17/759,441

(22) PCT Filed: Oct. 20, 2020

(86) PCT No.: PCT/JP2020/039438  
§ 371 (c)(1),  
(2) Date: Jul. 26, 2022

(87) PCT Pub. No.: WO2021/157139  
PCT Pub. Date: Aug. 12, 2021

(65) Prior Publication Data  
US 2023/0116057 A1    Apr. 13, 2023

(30) Foreign Application Priority Data

Feb. 3, 2020   (JP) .................................. 2020-016191

(51) Int. Cl.  
*H01M 50/489* (2021.01)  
*H01M 10/44* (2006.01)  
(Continued)

(52) U.S. Cl.  
CPC ....... *H01M 50/489* (2021.01); *H01M 10/441* (2013.01); *H01M 50/15* (2021.01);  
(Continued)

(58) Field of Classification Search  
CPC ............ H01M 50/489; H01M 50/262; H01M 50/414; H01M 50/242; H01M 50/244;  
(Continued)

(56) References Cited

U.S. PATENT DOCUMENTS

| 5,766,801 A | 6/1998 | Inoue et al. |
| 2012/0171554 A1 | 7/2012 | Kim |

(Continued)

FOREIGN PATENT DOCUMENTS

| JP | 9-120808 | 5/1997 |
| JP | 2000-048867 A | 2/2000 |

(Continued)

OTHER PUBLICATIONS

JP-2015138753 MT (Year: 2015).*

(Continued)

*Primary Examiner* — Alexander Usyatinsky  
(74) *Attorney, Agent, or Firm* — WHDA, LLP

(57) ABSTRACT

Power supply device includes a plurality of secondary battery cells each including an outer covering can having a quadrangular shape, a plurality of separators interposed between the plurality of secondary battery cells, a pair of end plates covering both side end faces of battery stack in which the plurality of secondary battery cells are stacked with the plurality of separators interposed between the plurality of secondary battery cells, and a plurality of fastening members each having a plate shape extending in a stacking direction of the plurality of secondary battery cells, and disposed on opposing side surfaces of battery stack to fasten the pair of end plates to each other. Separator has a spring constant of less than or equal to 500 kN/mm.

10 Claims, 16 Drawing Sheets

(51) Int. Cl.
  *H01M 50/15* (2021.01)
  *H01M 50/236* (2021.01)
  *H01M 50/242* (2021.01)
  *H01M 50/244* (2021.01)
  *H01M 50/262* (2021.01)
  *H01M 50/414* (2021.01)

(52) U.S. Cl.
  CPC ....... *H01M 50/236* (2021.01); *H01M 50/242* (2021.01); *H01M 50/244* (2021.01); *H01M 50/262* (2021.01); *H01M 50/414* (2021.01); *H01M 2220/20* (2013.01)

(58) Field of Classification Search
  CPC .. H01M 50/236; H01M 50/15; H01M 10/441; H01M 2220/20
  See application file for complete search history.

(56) References Cited

U.S. PATENT DOCUMENTS

| | | | |
|---|---|---|---|
| 2013/0316210 A1* | 11/2013 | Morita | H01M 10/052 429/211 |
| 2015/0017504 A1* | 1/2015 | Isshiki | B60L 53/65 429/120 |
| 2016/0083516 A1* | 3/2016 | Elomaa | C08L 77/04 525/437 |
| 2016/0268573 A1 | 9/2016 | Ishihara et al. | |
| 2018/0134863 A1* | 5/2018 | Krishnan | C08K 3/04 |
| 2020/0321575 A1 | 10/2020 | Terauchi et al. | |

FOREIGN PATENT DOCUMENTS

| | | | | |
|---|---|---|---|---|
| JP | 2015-138753 | | 7/2015 | |
| JP | 2015138753 A | * | 7/2015 | |
| JP | 2017-084550 | | 5/2017 | |
| JP | 2017084550 A | * | 5/2017 | |
| JP | 2017-098107 A | | 6/2017 | |
| JP | 2017-107648 A | | 6/2017 | |
| JP | 2019-021383 | | 2/2019 | |
| WO | 2012/111077 | | 8/2012 | |
| WO | 2013/145917 | | 10/2013 | |
| WO | 2019/130937 | | 7/2019 | |
| WO | WO-2019130937 A1 | * | 7/2019 | .......... H01M 2/1083 |

OTHER PUBLICATIONS

JP-2017084550 MT (Year: 2017).*
WO-2019130937 MT (Year: 2019).*
Extended (Supplementary) European Search Report dated May 22, 2024, issued in counterpart EP application No. 20917536.3. (7 pages).
English Translation of Chinese Search Report dated Nov. 11, 2023, issued in counterpart CN Patent Application No. 202080094778.7. (3 pages).
International Search Report of PCT application No. PCT/JP2020/039438 dated Nov. 24, 2020.

* cited by examiner

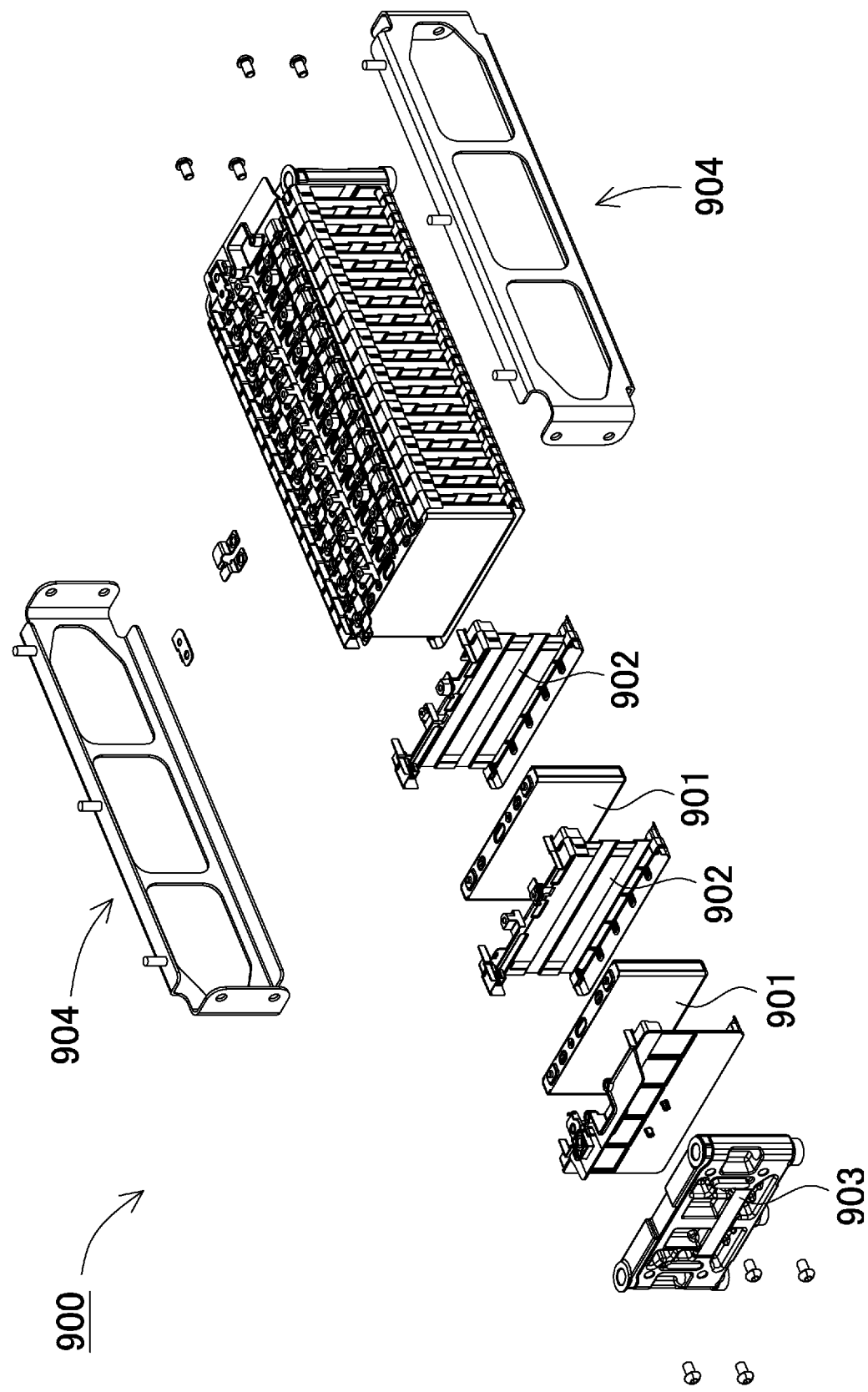

POWER SUPPLY DEVICE, ELECTRIC VEHICLE USING SAME, AND POWER STORAGE DEVICE

CROSS-REFERENCE TO RELATED APPLICATIONS

This application is a U.S. national stage application of the PCT International Application No. PCT/JP2020/039438 filed on Oct. 20, 2020, which claims the benefit of foreign priority of Japanese patent application No. 2020-016191 filed on Feb. 3, 2020, the contents all of which are incorporated herein by reference.

TECHNICAL FIELD

The present invention relates to a power supply device and an electric vehicle using the power supply device, and a power storage device.

BACKGROUND ART

A power supply device is used as a power supply device for driving an electric vehicle, a power supply device for power storage, or the like. In such a power supply device, a plurality of chargeable and dischargeable secondary battery cells are stacked. In general, as illustrated in a perspective view of FIG. 19, in power supply device 900, end plates 903 are disposed on both end faces of a battery stack in which secondary battery cells 901 of quadrangular outer covering cans and insulating spacers 902 are alternately stacked, and end plates 903 are fastened to each other by bind bars 904 made of metal.

The outer covering can of the secondary battery cell expands and contracts when charged and discharged repeatedly. In particular, with the recent demand for higher capacity, the capacity of each secondary battery cell is increasing. As a result, the amount of expansion tends to increase. In a battery stack in which a large number of such secondary battery cells are stacked and fastened, the swelling force of the secondary battery cells increases, and the expansion amount also increases in accordance with the number of secondary battery cells. In order to cope with such expansion of the secondary battery cell, it is necessary to increase the strength of each member constituting the power supply device and the fatigue strength of a spot welded part. On the other hand, it is required to exert sufficient fastening force even in a contracted state after expansion.

Also, weight reduction of the power supply device is required. Especially in an in-vehicle power supply device, fuel efficiency is strongly required to be improved, and it is also necessary to reduce the thickness of each member for weight reduction.

CITATION LIST

Patent Literature

PTL 1: Unexamined Japanese Patent Publication No. H09-120808

SUMMARY OF THE INVENTION

An object of the present invention is to provide a power supply device having enhanced followability to deformation such as expansion and contraction of a secondary battery cell, and an electric vehicle using the power supply device, and a power storage device.

A power supply device according to one aspect of the present invention includes a plurality of secondary battery cells each including an outer covering can having a quadrangular shape, a plurality of separators interposed between the plurality of secondary battery cells, a pair of end plates covering both end faces of a battery stack in which the plurality of secondary battery cells are stacked with the plurality of separators interposed between the plurality of secondary battery cells, and a plurality of fastening members each having a plate shape extending in a stacking direction of the plurality of secondary battery cells, and disposed on opposing side surfaces of the battery stack to fasten the pair of end plates to each other, in which the plurality of separators have a spring constant ranging from 100 kN/mm to 200 kN/mm inclusive.

The power supply device described above can effectively disperse the swelling force of the secondary battery cells, cope with the swelling force after dispersion in a wide range, and cope with a fluctuation in the swelling force caused by the increase in the capacity of the secondary battery cells.

BRIEF DESCRIPTION OF THE DRAWINGS

FIG. 19 is an exploded perspective view of a conventional power supply device.

DESCRIPTION OF EMBODIMENTS

Figure 1:
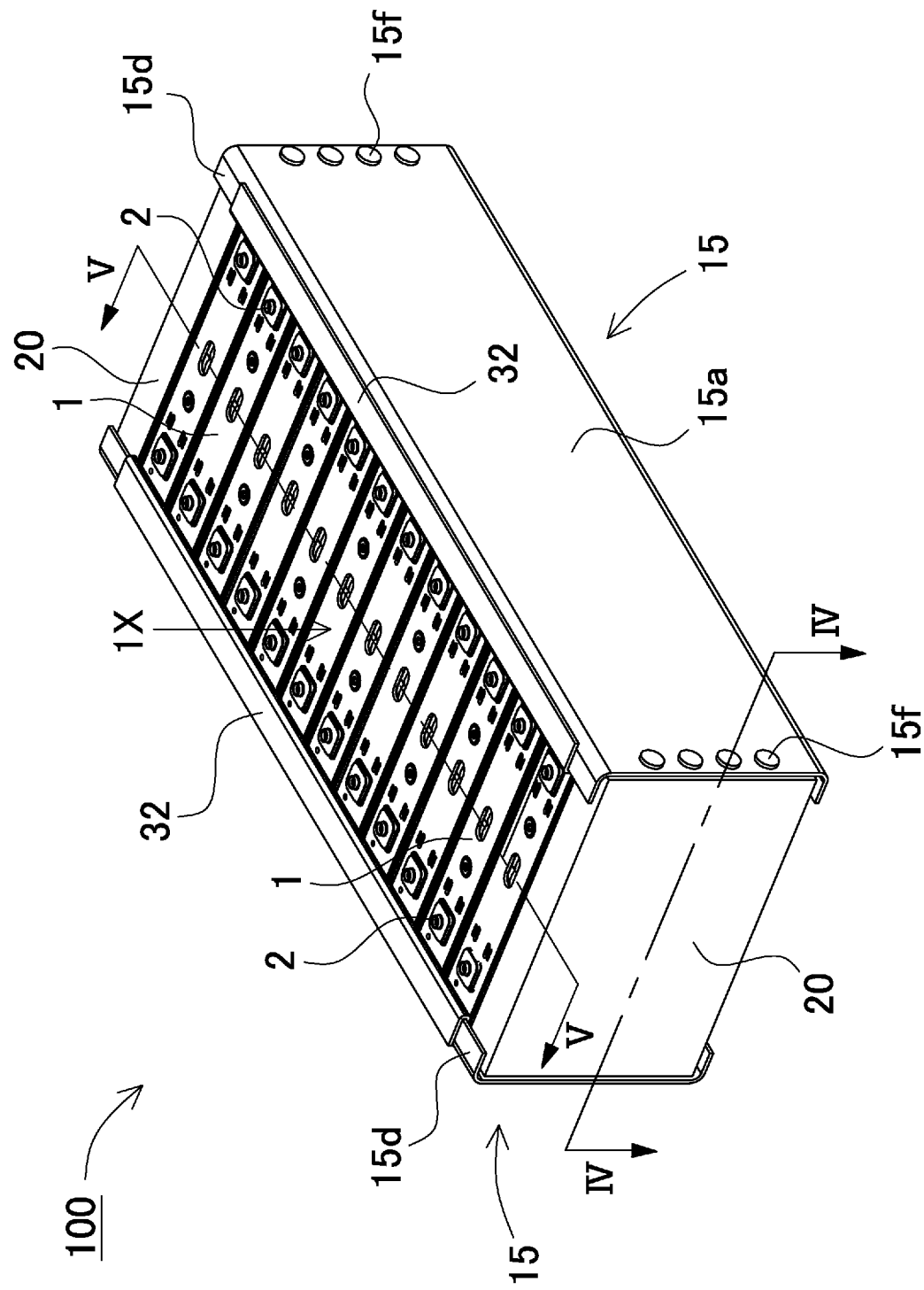
FIG. 1 is a perspective view illustrating a power supply device according to a first exemplary embodiment.

Exemplary embodiments of the present invention may be specified by the following configurations.

In a power supply device according to one exemplary embodiment of the present invention, the secondary battery cell has a swelling force of less than or equal to 200 kN.

In a power supply device according to another exemplary embodiment of the present invention, the secondary battery cell has a spring constant ranging from 50 kN/mm to 100 kN/mm inclusive.

In a power supply device according to still another exemplary embodiment of the present invention, the separator includes an elastic body.

In a power supply device according to still another exemplary embodiment of the present invention, the separator is a rubber elastic body or a spring elastic body.

In a power supply device according to still another exemplary embodiment of the present invention, the separator is an elastomer.

In a power supply device according to still another exemplary embodiment of the present invention, the separator includes urethane or silicone. The above configuration promotes exhibition of heat insulating property and heat resistance and facilitates adjustment of the spring constant.

In a power supply device according to still another exemplary embodiment of the present invention, the separator has a thickness of less than or equal to 10 mm.

In a power supply device according to still another exemplary embodiment of the present invention, the fastening member has a plate thickness of less than or equal to 2.8 mm.

In a power supply device according to still another exemplary embodiment of the present invention, each of the plurality of secondary battery cells includes an outer covering can having one opening and a sealing plate that closes the opening of the outer covering can, and hardness of a region of the separator facing the sealing plate of each of the plurality of secondary battery cells is higher than hardness of another region. In the above configuration, the hardness of the region in contact with the sealing plate is increased to suppress a deformation amount while the separator has a spring property. This configuration can suppress a situation in which the outer covering can is deformed during cell expansion and a welded part with the sealing plate is separated.

A vehicle according to still another exemplary embodiment of the present invention includes the power supply device, a motor for traveling supplied with electric power from the power supply device, a vehicle body equipped with the power supply device and the motor, and a wheel driven by the motor to cause the vehicle body to travel.

A power storage device according to still another exemplary embodiment of the present invention includes the power supply device and a power supply controller that controls charging to and discharging from the power supply device, in which the power supply controller enables charging to the secondary battery cells with electric power from an outside, and controls charging to the secondary battery cells.

Hereinafter, the exemplary embodiments of the present invention will be described with reference to the drawings. However, the exemplary embodiments described below are examples for embodying the technical idea of the present invention, and the present invention is not limited to the following. In the present specification, members indicated in the claims are not limited to the members of the exemplary embodiments. In particular, the dimensions, materials, shapes, and the relative arrangement of the constituent members described in the exemplary embodiments are not intended to limit the scope of the present invention only thereto unless otherwise specified and are merely illustrative examples. The sizes and positional relationships of the members shown in the drawings may be exaggerated for clarity of description. In the following description, the same names and reference marks indicate the same or similar members, and detailed description will be appropriately omitted. The elements constituting the present invention may be configured such that the plurality of elements are constituted of the same members to form one member that functions as a plurality of elements, or conversely, the function of one member can be shared and achieved by a plurality of members. The description in some examples or exemplary embodiments may be applied to other examples, exemplary embodiments, and the like.

The power supply device according to the exemplary embodiments is used in various applications including a power source to be mounted on a hybrid vehicle, an electric automobile, or other electric vehicles to supply electric power to a drive motor, a power source that stores power generated by natural energy such as solar power generation and wind power generation, and a power source for storing midnight electric power. In particular, the power supply device can be used as a power source suitable for large power and large current applications. In the following example, the exemplary embodiments applied to a power supply device for driving an electric vehicle will be described.

First Exemplary Embodiment

Figure 2:
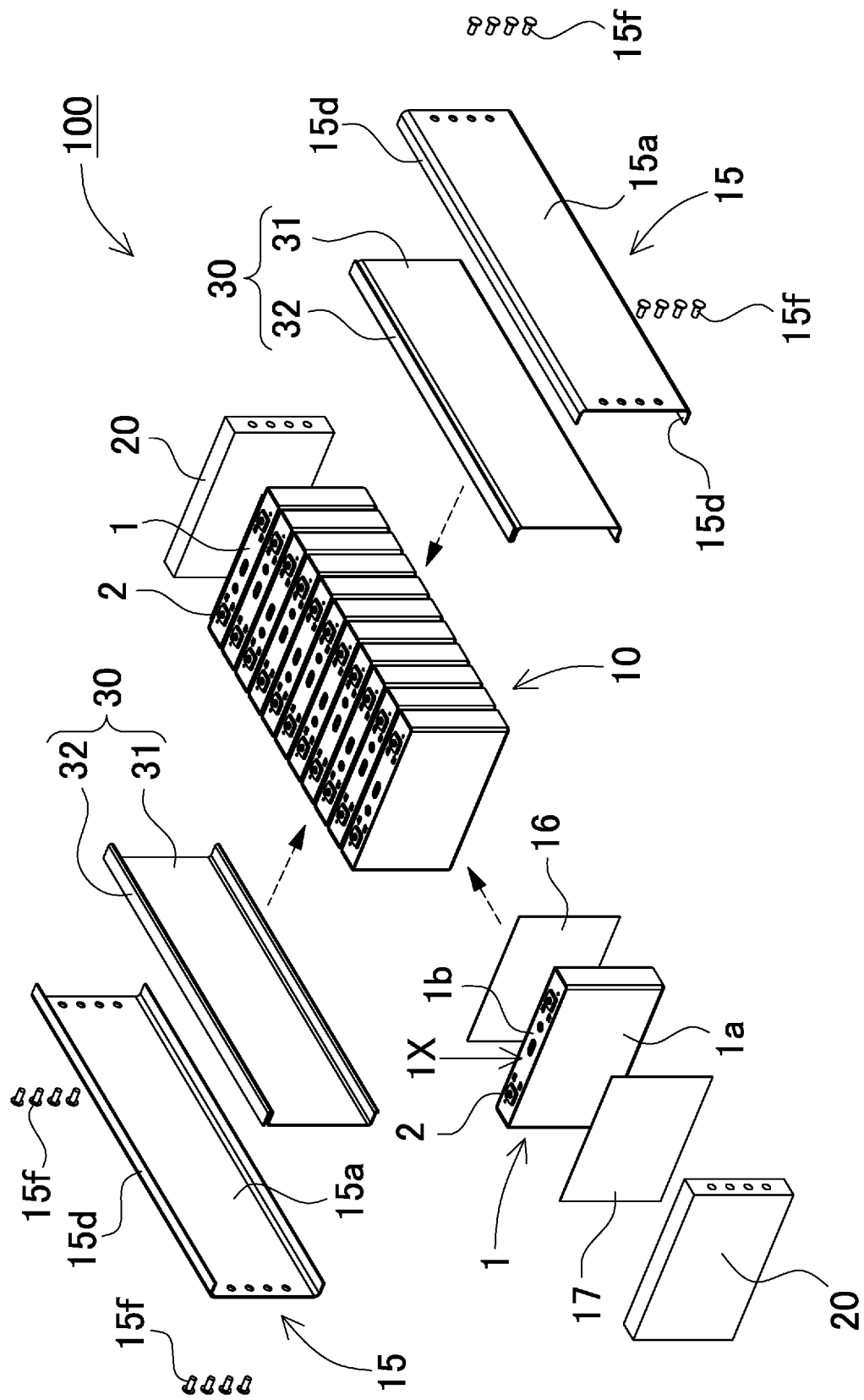
FIG. 2 is an exploded perspective view of the power supply device in FIG. 1.
Figure 3:
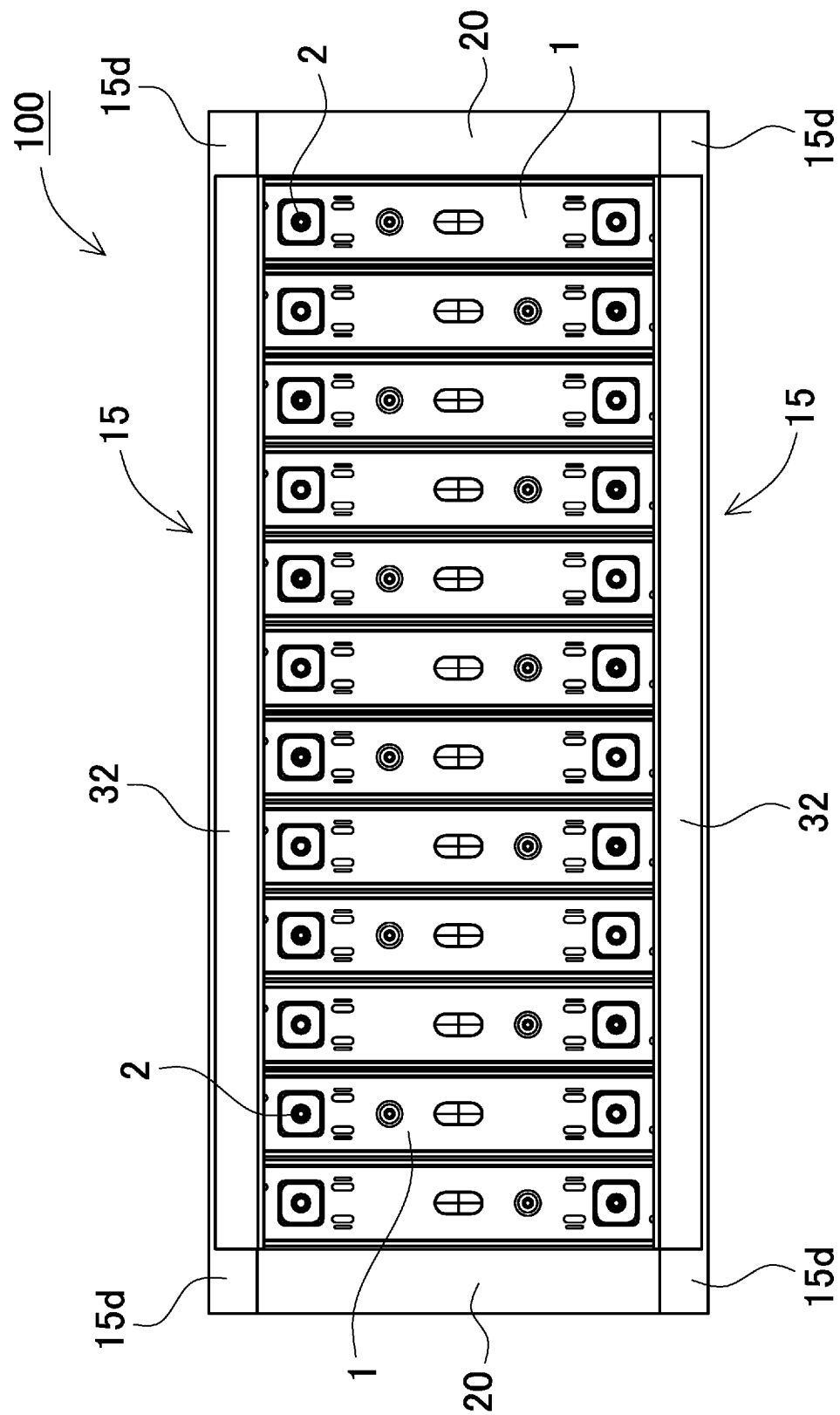
FIG. 3 is a plan view of the power supply device in FIG. 1.
Figure 4:
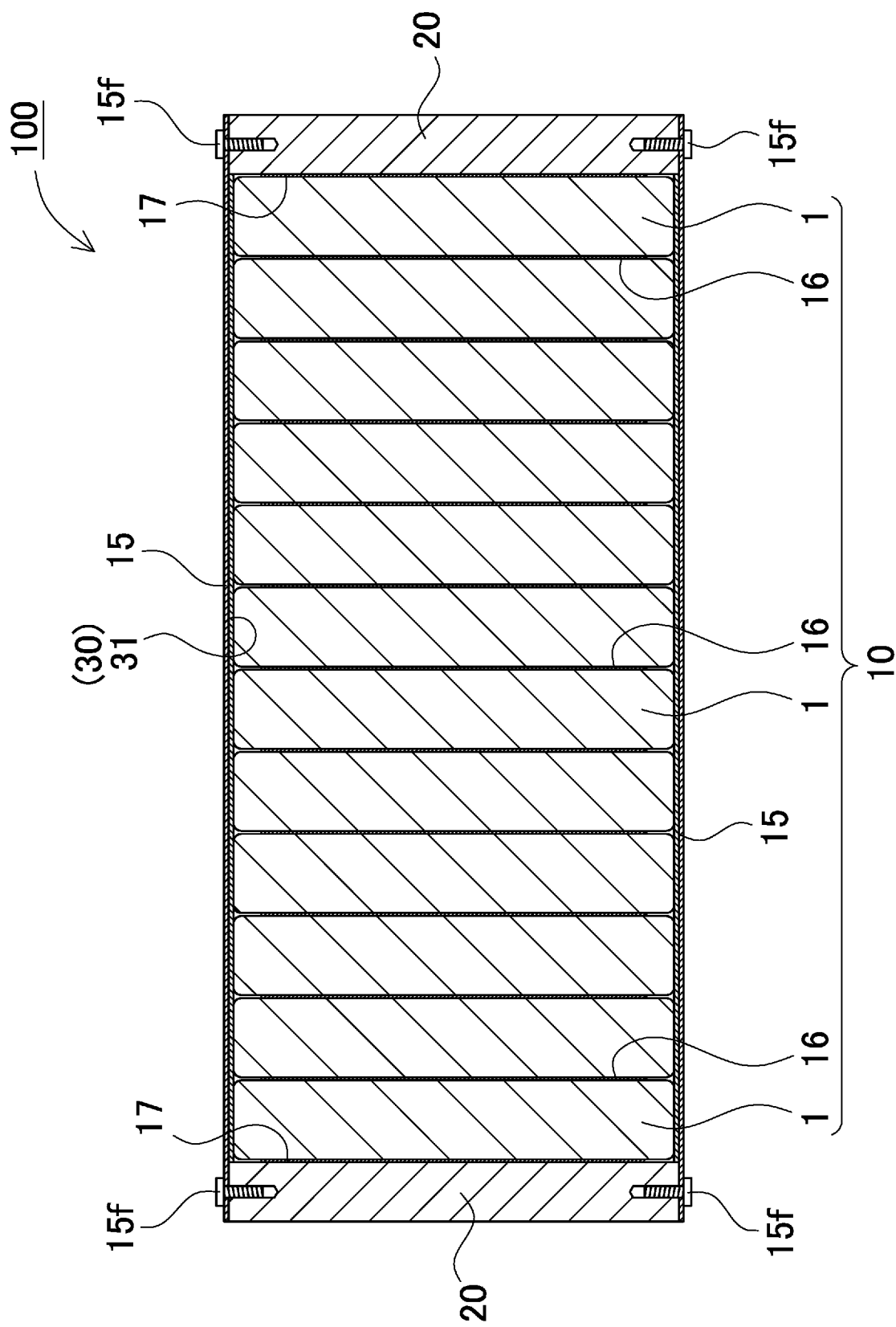
FIG. 4 is a horizontal sectional view of the power supply device in FIG. 1 taken along line IV-IV.
Figure 5:
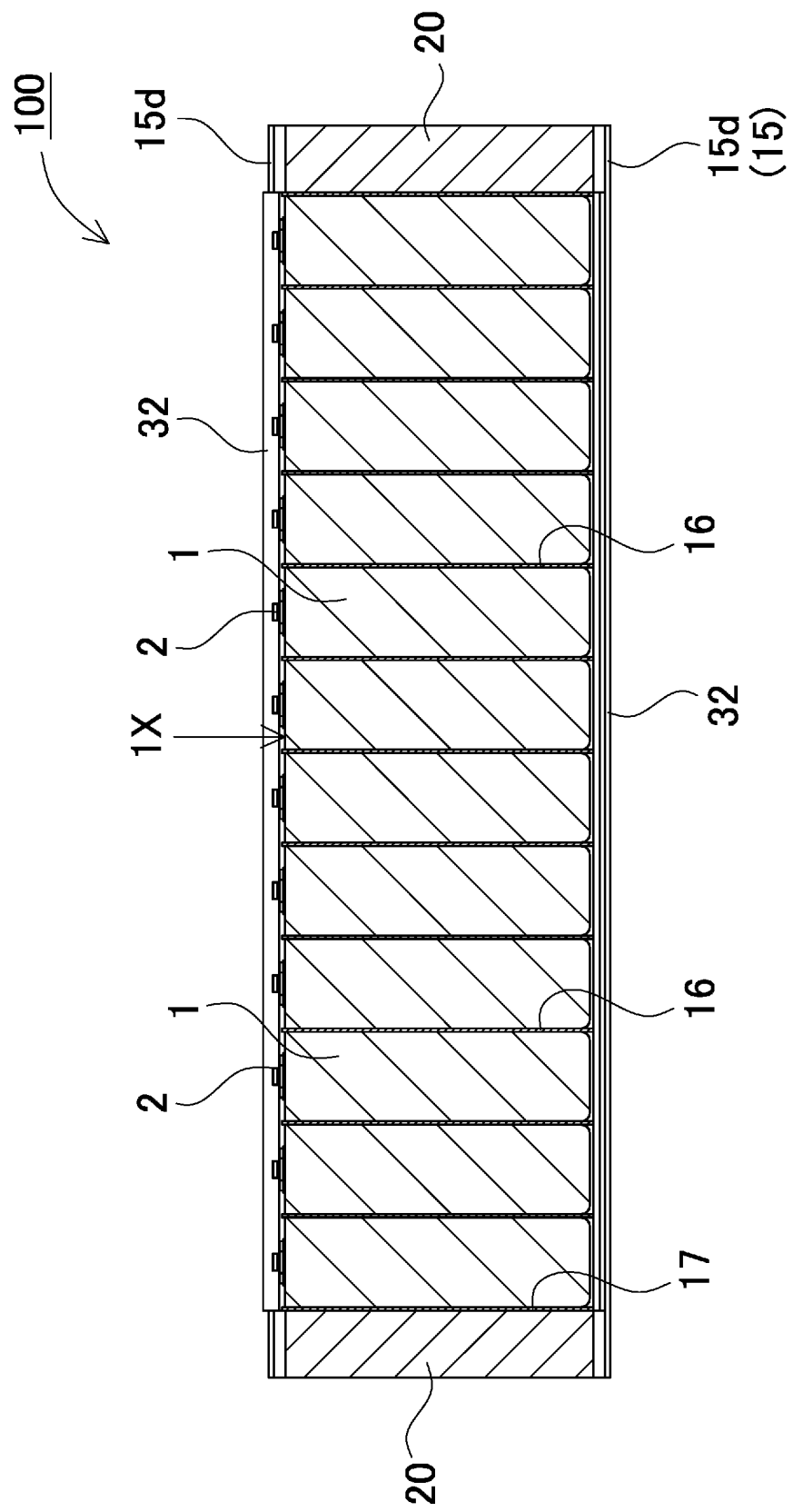
FIG. 5 is a vertical sectional view of the power supply device taken along line V-V in FIG. 1.

Power supply device 100 according to a first exemplary embodiment of the present invention is shown in FIGS. 1 to 5. In these drawings, FIG. 1 is a perspective view of power supply device 100 according to the first exemplary embodiment, FIG. 2 is an exploded perspective view of power supply device 100 in FIG. 1, FIG. 3 is a plan view of power supply device 100 in FIG. 1, FIG. 4 is a horizontal sectional view of power supply device 100 taken along line IV-IV in FIG. 1, and FIG. 5 is a vertical sectional view of power supply device 100 taken along line V-V in FIG. 1. Power supply device 100 illustrated in these drawings includes battery stack 10 in which secondary battery cells 1 are stacked, a pair of end plates 20 covering both end faces of battery stack 10, a plurality of fastening members 15 that fastens the pair of end plates 20 to each other, and insulating sheet 30 that is insulative and interposed between each of the plurality of fastening members 15 and battery stack 10.

(Battery Stack 10)

As illustrated in FIGS. 1, 2, and the like, battery stack 10 includes the plurality of secondary battery cells 1 each including positive and negative electrode terminals 2, and bus bars (not shown) connected to electrode terminals 2 of the plurality of secondary battery cells 1 to connect the plurality of secondary battery cells 1 in parallel and in series. The plurality of secondary battery cells 1 are connected in parallel or in series through the bus bars. Each secondary battery cell 1 is a chargeable and dischargeable secondary battery. In power supply device 100, the plurality of secondary battery cells 1 are connected in parallel to form a parallel battery group, and a plurality of parallel battery groups are connected in series to form a large number of secondary battery cells 1 connected in parallel and in series. In power supply device 100 illustrated in FIGS. 1 and 2, the plurality of secondary battery cells 1 are stacked to form battery stack 10. The pair of end plates 20 are disposed on both end faces of battery stack 10. Ends of fastening members 15 are fixed to both end plates 20 to fix stacked secondary battery cells 1 in a pressed state.

(Secondary Battery Cell 1)

Secondary battery cell 1 is a prismatic battery having a main surface as a wider surface with a quadrangular outer shape and having fixed cell thickness CD, the thickness being smaller than a width. Secondary battery cell 1 is a chargeable and dischargeable secondary battery and a lithium ion secondary battery. However, in the present invention, the secondary battery cells are not limited to prismatic batteries and are not limited to lithium ion secondary batteries. The secondary battery cells may be any rechargeable batteries, such as non-aqueous electrolyte secondary batteries or nickel hydride secondary batteries, other than lithium ion secondary batteries.

As illustrated in FIGS. 2 to 5, secondary battery cell 1 includes outer covering can 1a that accommodates an electrode assembly formed by stacking positive and negative electrode plates, and that is filled with an electrolyte solution and hermetically sealed. Outer covering can 1a is formed into a quadrangular cylindrical shape whose bottom is closed and has an upper opening that is hermetically closed by sealing plate 1b of a metal sheet. Outer covering can 1a is formed by deep-drawing a metal sheet of aluminum, aluminum alloy, or the like. Sealing plate 1b is made of a metal sheet of aluminum, aluminum alloy, or the like in the same manner as outer covering can 1a. Sealing plate 1b is inserted into the opening of outer covering can 1a, a boundary between an outer periphery of sealing plate 1b and an inner periphery of outer covering can 1a is irradiated with laser light, and sealing plate 1b is laser-welded to outer covering can 1a to be hermetically fixed.

(Electrode Terminal 2)

In secondary battery cell 1, as shown in FIG. 2 and the like, sealing plate 1b being a top surface serves as terminal surface 1X, and positive and negative electrode terminals 2 are fixed to both ends of terminal surface 1X. Electrode terminal 2 has a protrusion having a circular columnar shape. However, the protrusion does not necessarily have to be columnar, and may be polygonal or elliptical.

Positive and negative electrode terminals 2 fixed to sealing plate 1b of secondary battery cell 1 are positioned such that the positive and negative electrodes are symmetrical. This enables adjacent secondary battery cells 1 to be connected in series by stacking secondary battery cells 1 in an alternately and horizontally reversed manner and connecting electrode terminals 2 of the positive electrode and the negative electrode that are adjacent and close to each other by the bus bars, as shown in FIGS. 2, 3, and the like. Note that the present invention does not limit a number and a connection state of the secondary battery cells constituting the battery stack. The exemplary embodiment as well as other exemplary embodiments described later may vary in number and connection state of the secondary battery cells constituting the battery stack.

(Battery Stack 10)

The plurality of secondary battery cells 1 are stacked to constitute battery stack 10 such that a thickness direction of each of secondary battery cells 1 aligns with a stacking direction of the secondary battery cells. In battery stack 10, the plurality of secondary battery cells 1 are stacked such that terminal surfaces 1X provided with positive and negative electrode terminals 2, or sealing plates 1b in FIGS. 1 and 2, are flush with one another.

(Separator 16)

Battery stack 10 has separator 16 interposed between secondary battery cells 1 stacked adjacent to each other. Separator 16 is made of an insulating material such as resin in the form of a thin plate or sheet. Separator 16 has a plate shape having a size substantially equal to an opposing face of secondary battery cell 1. Separators 16 are stacked between secondary battery cells 1 adjacent to each other to insulate adjacent secondary battery cells 1 from each other. The separator disposed between the adjacent secondary battery cells may be a separator that is shaped such that a flow path for a cooling gas is formed between the secondary battery cell and the separator. Further, the surface of the secondary battery cell can be coated with an insulating material. A shrink tube made of polyethylene terephthalate (PET) resin, for example, may be thermally welded on a surface of the outer covering can, excluding the electrodes, of the secondary battery cell.

Power supply device 100 illustrated in FIG. 2 includes end plates 20 disposed on both end faces of battery stack 10. End face separator 17 may also be interposed between end plate 20 and battery stack 10 to insulate the two. End face separator 17 can also be formed in the form of a thin plate or sheet with an insulating material such as resin.

Power supply device 100 according to the first exemplary embodiment includes battery stack 10 including the plurality of secondary battery cells 1 stacked on one another. In the battery stack, electrode terminals 2 of secondary battery cells 1 adjacent to each other are connected via the bus bar to connect the plurality of secondary battery cells 1 in parallel and in series. A bus bar holder may be disposed between battery stack 10 and the bus bars. Use of the bus bar holder allows a plurality of the bus bars to be insulated from each other and allows the plurality of the bus bars to be disposed at fixed places on a top surface of the battery stack while the terminal surfaces of the secondary battery cells are insulated from the bus bars.

The bus bar is made by cutting and processing a metal sheet to have a predetermined shape. As the metal sheet for forming the bus bar, a sheet of metal that is light and has low electrical resistance, such as a sheet of aluminum, a sheet of copper, or a sheet of an alloy of these metals can be used. However, the metal sheet for the bus bar may be a sheet of any of other lightweight metals that have low electrical resistance or a sheet of an alloy of these metals.

(End Plate 20)

As illustrated in FIGS. 1 to 4, end plates 20 are disposed at both ends of battery stack 10 and fastened via a pair of left and right fastening members 15 disposed along both side surfaces of battery stack 10. End plates 20 are arranged on the outside of end face separators 17, which are both ends in the stacking direction of secondary battery cells 1 of battery stack 10, and sandwich battery stack 10 from both ends.

(Fastening Member 15)

Fastening member 15 has both ends fixed to end plates 20 disposed on both end faces of battery stack 10. End plates 20 are fixed by a plurality of fastening members 15 to fasten battery stack 10 in the stacking direction. As illustrated in FIG. 2 and the like, each of fastening members 15 is made of metal having a predetermined width and a predetermined thickness along the side surface of battery stack 10, and is disposed opposite to both side surfaces of battery stack 10. A metal sheet of iron or the like, preferably a steel sheet, can be used as fastening member 15. Fastening member 15 made of a metal sheet is bent by press molding or the like to form a predetermined shape.

Fastening member 15 has an upper and lower parts of plate-shaped fastening main surface 15a bent in a U-shape to form bent pieces 15d. Upper and lower bent pieces 15d cover upper and lower surfaces of battery stack 10 from the corners on the left and right side surfaces of battery stack 10. Fastening member 15 is fixed to an outer peripheral surface of end plate 20 by screwing bolts 15f into a plurality of screw holes opened in fastening main surface 15a. Fastening main surface 15a and end plate 20 are not necessarily fixed by screwing with bolts, and may be fixed with, for example, pins or rivets.

Power supply device 100 in which the large number of secondary battery cells 1 are stacked is configured to restrain the plurality of secondary battery cells 1 by connecting, with fastening members 15, end plates 20 disposed at both ends of battery stack 10 including the plurality of secondary battery cells 1. By restraining the plurality of secondary battery cells 1 using end plates 20 and fastening members 15 having high rigidity, malfunctions due to expansion, deformation, relative movement, and vibration of secondary battery cells 1 due to charging and discharging and degradation can be suppressed.

(Insulating Sheet 30)

Insulating sheet 30 is interposed between fastening member 15 and battery stack 10.

Insulating sheet 30 is made of a material having insulating properties, such as a resin or the like, and insulates fastening member 15 made of metal and the battery cells. Insulating sheet 30 illustrated in FIG. 2 and the like includes flat plate 31 for covering the side surface of battery stack 10, and bent covers 32 provided on an upper part and a lower part of flat plate 31. Bent covers 32 are each bent from flat plate 31 in a U-shape so as to cover bent pieces 15d of fastening member 15. As a result, bent pieces 15d are covered with the insulating bent covers from an upper surface to a side surface and a lower surface This can avoid unintended conduction between secondary battery cell 1 and fastening member 15.

Bent pieces 15d press the upper surface and the lower surface of secondary battery cells 1 of battery stack 10 via the bent covers. As a result, each secondary battery cell 1 is pressed by bent pieces 15d from an up-down direction and held in a height direction, and even when vibration, impact, or the like is applied to battery stack 10, each secondary battery cell 1 can be maintained so as not to be displaced in the up-down direction.

The insulating sheet is unnecessary in a case where the battery stack or a surface of the battery stack is insulated, for example, in a case where the secondary battery cell is housed in an insulating case or covered with a heat-shrinkable film made of a resin, or in a case where an insulating paint or coating is applied to a surface of the fastening member, or in a case where the fastening member is made of an insulating material. Insulating sheet 30 may also have bent cover 32 formed only on an upper end when insulation from bent piece 15d of fastening member 15 does not need to be taken into consideration on the lower surface of battery stack 10. This corresponds to, for example, a case where secondary battery cell 1 is covered with a heat-shrinkable film. Insulating sheet 30 may also be used as a bus bar holder for holding the above-described bus bar.

(Cell Swelling Force Dispersion Function)

The separator has a cell swelling force dispersion function of dispersing a swelling force generated when the secondary battery cell expands. Due to the recent demand for higher output of power sources, the expansion amount of secondary battery cells is increasing. In other words, the cell swelling force with which each secondary battery cell expands tends to increase. The expansion amount of the entire battery stack in which a large number of such secondary battery cells are stacked also tends to increase in proportion to the increase in cell swelling force. On the other hand, in the configuration in which the battery stack is fastened by the fastening members, it is necessary to maintain a state where the secondary battery cells are stacked and fastened whether the secondary battery cells are expanded or are contracted to recover the original thickness from the expanded state. The strength of each member and the fatigue strength of the spot welded part are also required so as not to cause damage or breakage due to expansion or contraction of the secondary battery cells. As described above, it is becoming difficult to cope with high output and high capacity of secondary battery cells.

Meanwhile, increasing the thickness of the fastening members, the end plates, the separator, and the like in order to exhibit high strength will result in an increase in weight and thus should be avoided. Especially for power supply devices for vehicles, light weight is strongly required to improve fuel efficiency.

In order to respond to such conflicting demands, the present inventor has conceived, as a result of earnest research, that a separator has a cell swelling force dispersion function, and the present inventor has completed the present invention. Specifically, the present inventor has found that a separator capable of dispersing a swelling force without depending on a cell swelling force can be achieved by configuring the separator with an elastic body and suppressing a spring constant of the elastic body to less than or equal to 500 kN/mm.

The present inventor has derived a load after the cell swelling force is dispersed from the rigidity of the structural members, the secondary battery cells, and the separator. Here, as a premise, the swelling force when the secondary battery cell is pressed with a rigid body is assumed to be up to 200 kN. The spring constant (referred to as "cell spring constant") of the secondary battery cell is considered to range from 50 kN to 100 kN inclusive. Under this condition, a relationship between a cell expansion amount and a cell expansion force when the separator having spring constant $K_S$ and the secondary battery cell having cell spring constant $K_C$ are used is illustrated in a graph in FIG. 6. In this drawing, an intersection point at which cell spring constant $K_C$ of the secondary battery cell and spring constant $K_S$ of the separator (referred to as "separator spring constant") are balanced is cell swelling force F, and is obtained from the following Equation 1.

$$F=K_S\Delta x=K_C(x-\Delta x) \quad \text{[Equation 1]}$$

Here, a case is considered where cell spring constant $K_C$=50 kN/mm to 100 kN/mm and the cell swelling force is less than or equal to 200 kN in the secondary battery cell.

Figure 6:
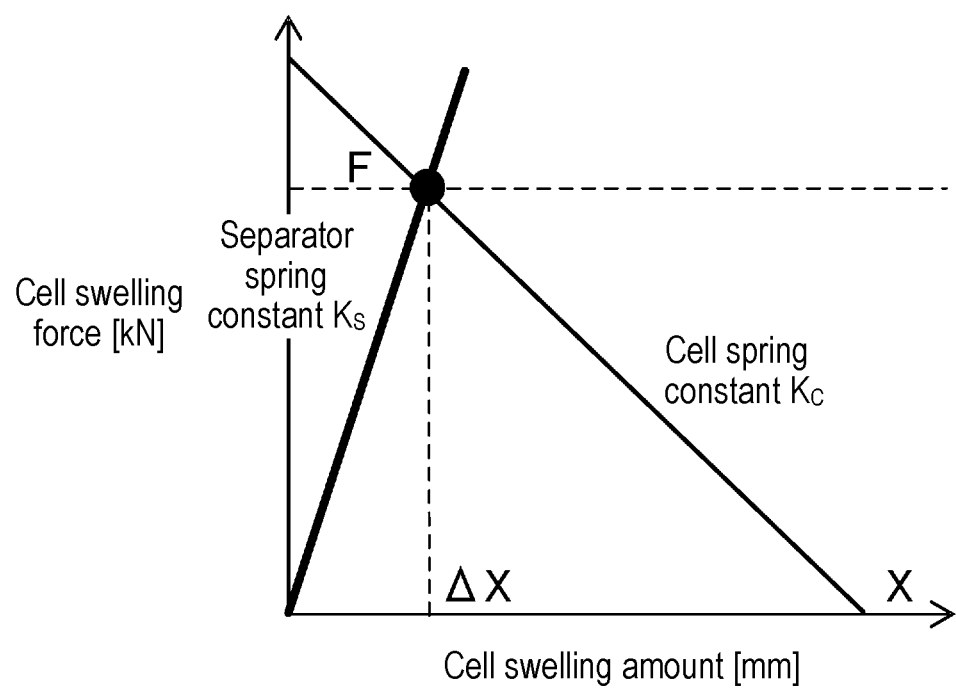
FIG. 6 is a graph illustrating a relationship between a cell expansion amount and a cell expansion force of a spring constant of a separator and a spring constant of a battery cell.
Figure 7:
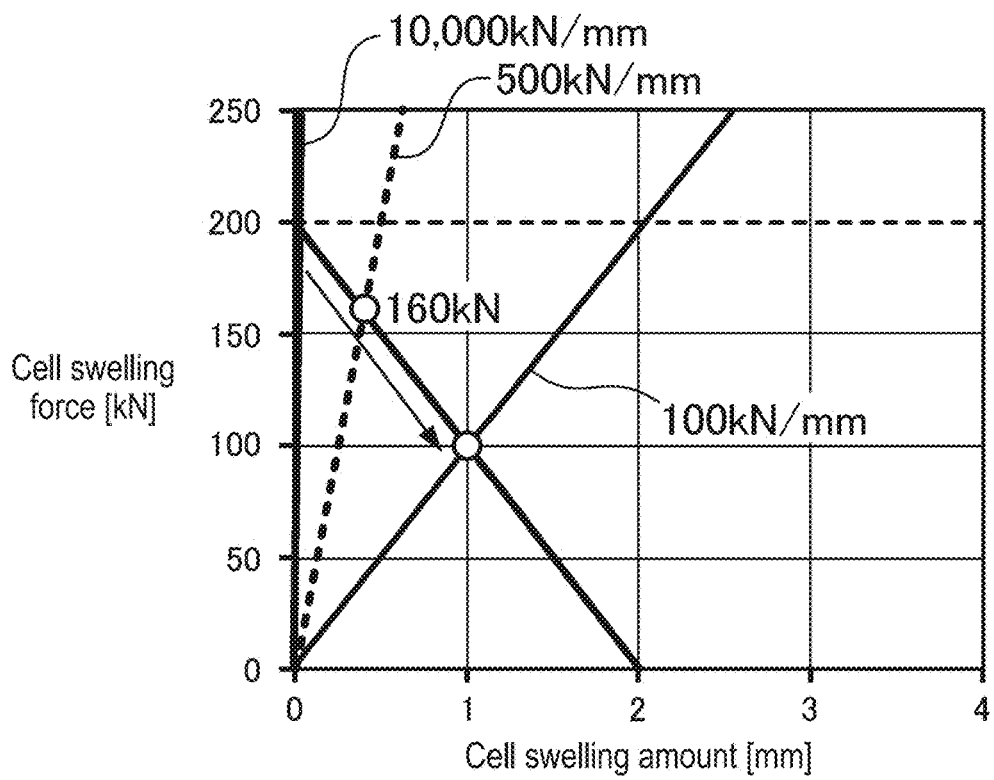
FIG. 7 is a graph illustrating a relationship between a cell swelling amount and a cell swelling force in a case where secondary battery cells having a cell spring constant of 100 kN/mm are fastened with separators having different separator spring constants.
Figure 8:
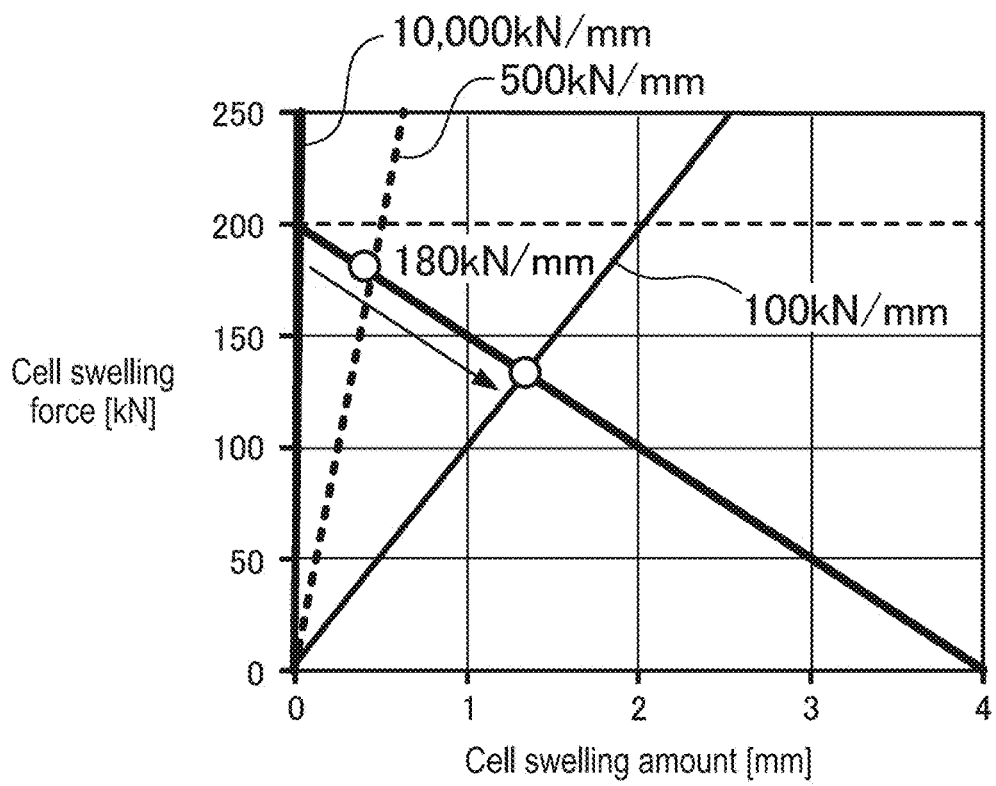
FIG. 8 is a graph illustrating a relationship between a cell swelling amount and a cell swelling force in a case where secondary battery cells having a cell spring constant of 50 kN/mm are fastened with separators having different separator spring constants.

Next, FIG. 7 illustrates the relationship between the cell swelling amount and the cell swelling force when the secondary battery cells having cell spring constant $K_C$=100 kN/mm are fastened using the separators having separator spring constants $K_S$=10,000 kN/mm, 500 kN/mm, and 100 kN/mm in the graph in FIG. 6. FIG. 8 illustrates the relationship between the cell swelling amount and the cell swelling force when the secondary battery cell having cell spring constant $K_C$=50 kN/mm are fastened using a similar separator.

As illustrated in FIG. 7, in a case where the secondary battery cells have cell spring constant $K_C$=100 kN/mm, by using the separator having separator spring constant $K_S$=500 kN/mm, the cell swelling force can be reduced to 160 kN even when the cell swelling force is 200 kN. That is, the cell swelling force can be reduced by 20%. Furthermore, by using the separator having separator spring constant $K_S$=100 kN/mm, the cell swelling force can be reduced by 50% from 200 kN to 100 kN.

As illustrated in FIG. 8, in a case where the secondary battery cells have cell spring constant $K_C$=50 kN/mm, by using the separator having separator spring constant $K_S$=500 kN/mm, the cell swelling force can be reduced by 10% to 180 kN even when the cell swelling force is 200 kN. Furthermore, by using the separator having separator spring constant $K_S$=100 kN/mm, the cell swelling force can be reduced by 30% from 200 kN to 140 kN.

Figure 9:
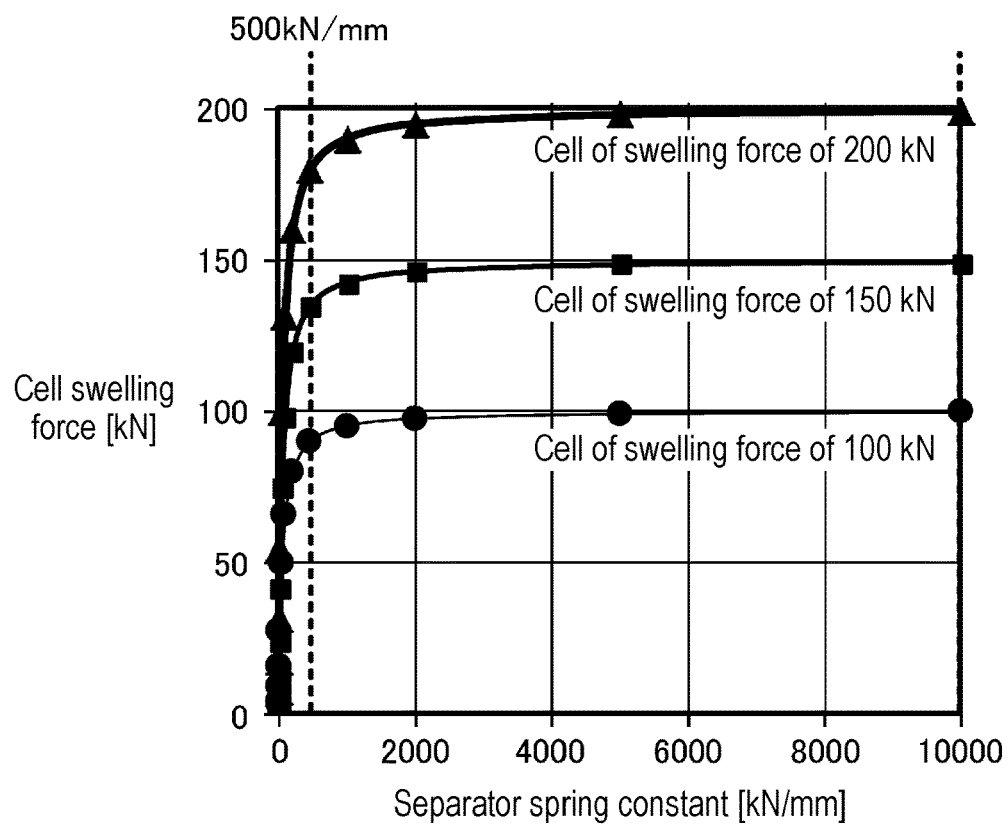
FIG. 9 is a graph illustrating a relationship between a separator spring constant and a cell swelling force in a case where secondary battery cells having a cell spring constant of 100 kN/mm and different swelling forces are fastened with separators.

In this way, when cell spring constant $K_C$ is lowered, the cell swelling force increases. The degree of the influence has been examined in FIGS. 9 and 10. Here, the relationship between separator spring constant $K_S$ and the cell swelling force when the secondary battery cells having the cell swelling forces of 200 kN, 150 kN, and 100 kN are fastened with the separator is illustrated in graphs in FIGS. 9 and 10. In FIG. 9, the secondary battery cells having cell spring constant $K_C$=50 kN/mm are used, and in FIG. 10, the secondary battery cells having cell spring constant $K_C$=100 kN/mm are used. In a conventional separator, since separator spring constant $K_S$=10,000 kN/mm or more, dispersion effect of the cell swelling force for dispersing a reaction force when the secondary battery cells are fastened can hardly be exhibited.

Figure 10:
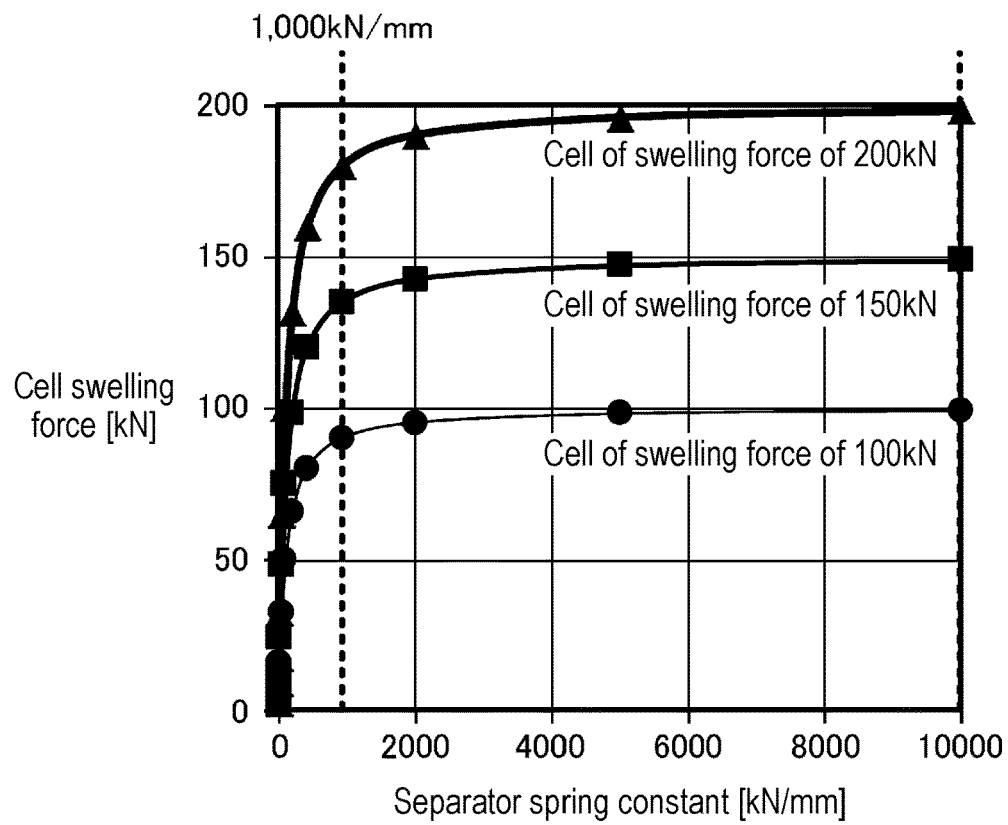
FIG. 10 is a graph illustrating a relationship between a separator spring constant and a cell swelling force in a case where secondary battery cells having a cell spring constant of 50 kN/mm and different swelling forces are fastened with separators.

In an example in FIG. 10, the cell swelling force is reduced by about 10% at separator spring constant $K_S$=1,000 kN/mm, and it can be seen that the cell swelling force is greatly reduced and the dispersion effect of the cell swelling force is exhibited in a range where separator spring constant $K_S$ is less than 1,000 kN/mm. In an example in FIG. 9, the cell swelling force is reduced by about 10% at separator spring constant $K_S$=500 kN/mm, and it can be seen that the cell swelling force is greatly reduced and the dispersion effect of the cell swelling force is exhibited in a range where separator spring constant $K_S$ is less than 500 kN/mm. As described above, it has been found that a line at a dispersion ratio of 10% of the cell swelling force is an inflection point. It has been therefore confirmed that separator spring constant $K_S$ below this line is significantly effective. In addition, from FIGS. 9 and 10, it is estimated that the dispersion ratio is substantially the same in the cell swelling forces of 100 kN, 150 kN, and 200 kN, and the results are also the same in cell swelling rates. It is thus confirmed that the dispersion ratio of a cell reaction force does not depend on the cell swelling force at a time of rigid body restraint. It has also become apparent from FIGS. 9 to 10 that the lower separator spring constant $K_S$, the lower the dispersion ratio. Therefore, it can be said that separator spring constant $K_S$ of the separator capable of contributing to dispersion of the cell swelling force is preferably less than or equal to 500 kN/mm for any secondary battery cell.

[Separator Spring Constant for Swelling Force Dispersion]

Figure 11:
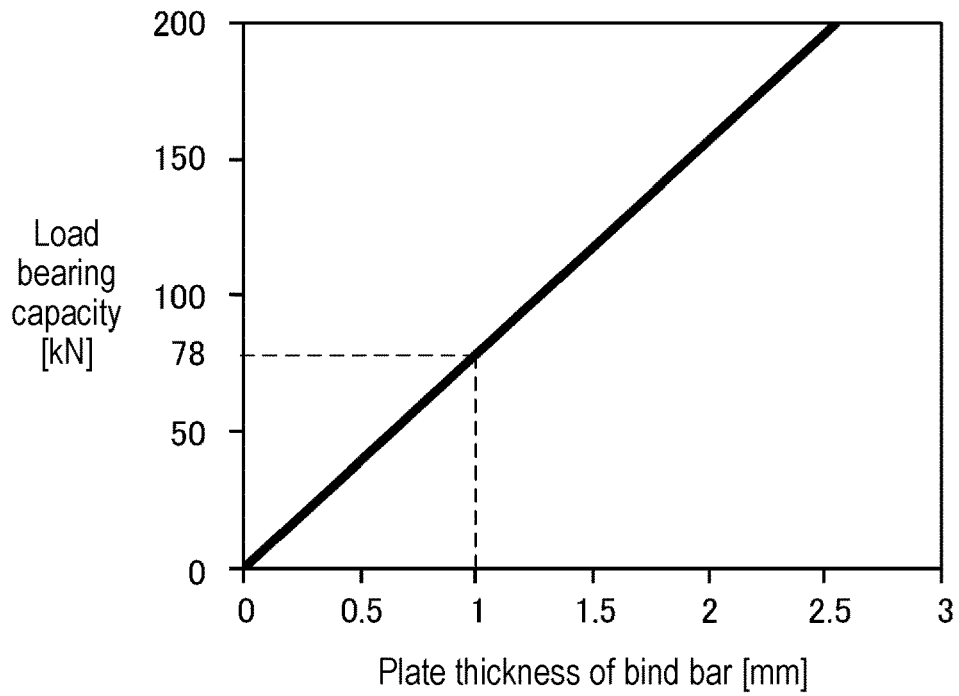
FIG. 11 is a graph illustrating a relationship between a plate thickness of a bind bar and a load bearing capacity.

Here, in order to reduce the weight and size of the power supply device, plate thicknesses of the bind bar and the end plate and the spring constant of the separator will be examined. First, FIG. 11 is a graph illustrating a relationship between the plate thickness of the bind bar and a load bearing capacity. Here, it is assumed that a material of the bind bar is SPFC980Y, a height dimension is 80 mm, and a proof stress is 490 MPa. The drawing shows that when the bind bar has a plate thickness of 1 mm, the load bearing capacity is about 78 kN.

Figure 12:
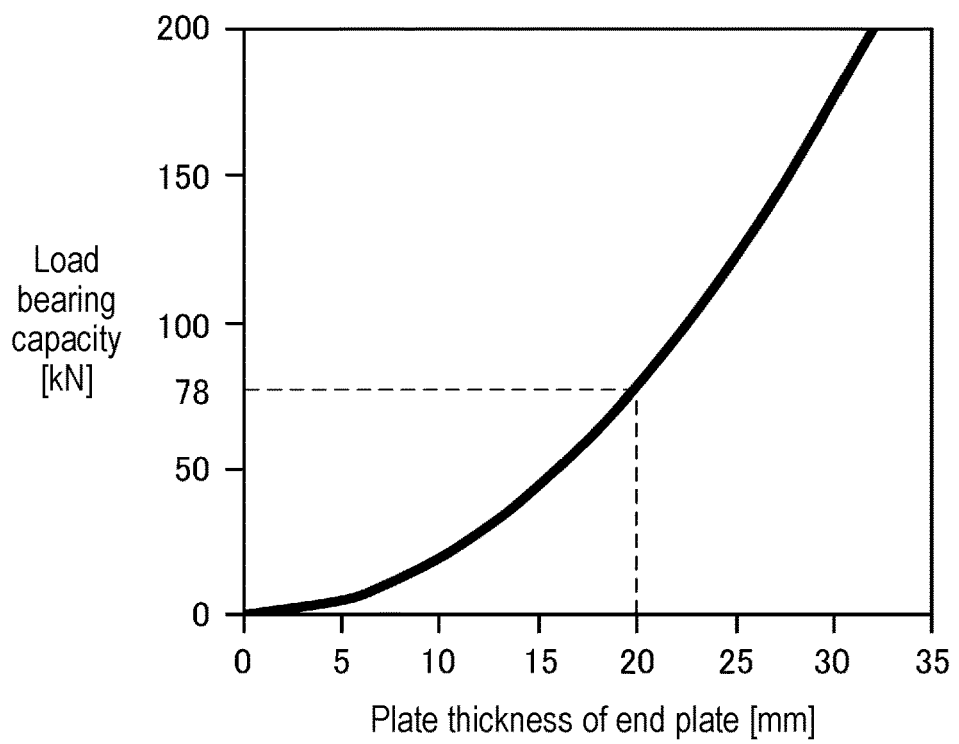
FIG. 12 is a graph illustrating a relationship between a plate thickness of an end plate and a load bearing capacity.

Next, FIG. 12 is a graph illustrating a relationship between the plate thickness of the end plate and the load bearing capacity. Here, it is assumed that a material of the end plate is A6061-T6, a height dimension is 80 mm, a width dimension is 150 mm, and a proof stress is 275 MPa. The drawing shows that when the end plate has a plate thickness of 20 mm, the load bearing capacity is about 78 kN.

From the above, it has been found that when the bind bar is 1 mm and the end plate is 20 mm, the load bearing capacity of 78 kN can be achieved. Thus, assuming that the swelling force of the secondary battery cell is, for example, 100 kN as a necessary reducing reaction force, the load bearing capacity is 78 kN with the bind bar of 1 mm and the end plate of 20 mm. It is therefore sufficient to reduce the reaction force by 22 kN by the spring property of the separator. When the cell swelling force is assumed to be 150 kN, it is sufficient to reduce the cell swelling force by 72 kN, and when the cell swelling force is assumed to be 200 kN, it is sufficient to reduce the cell swelling force by 122 kN. From the above, the spring constant required for the separator is calculated.

Figure 13:
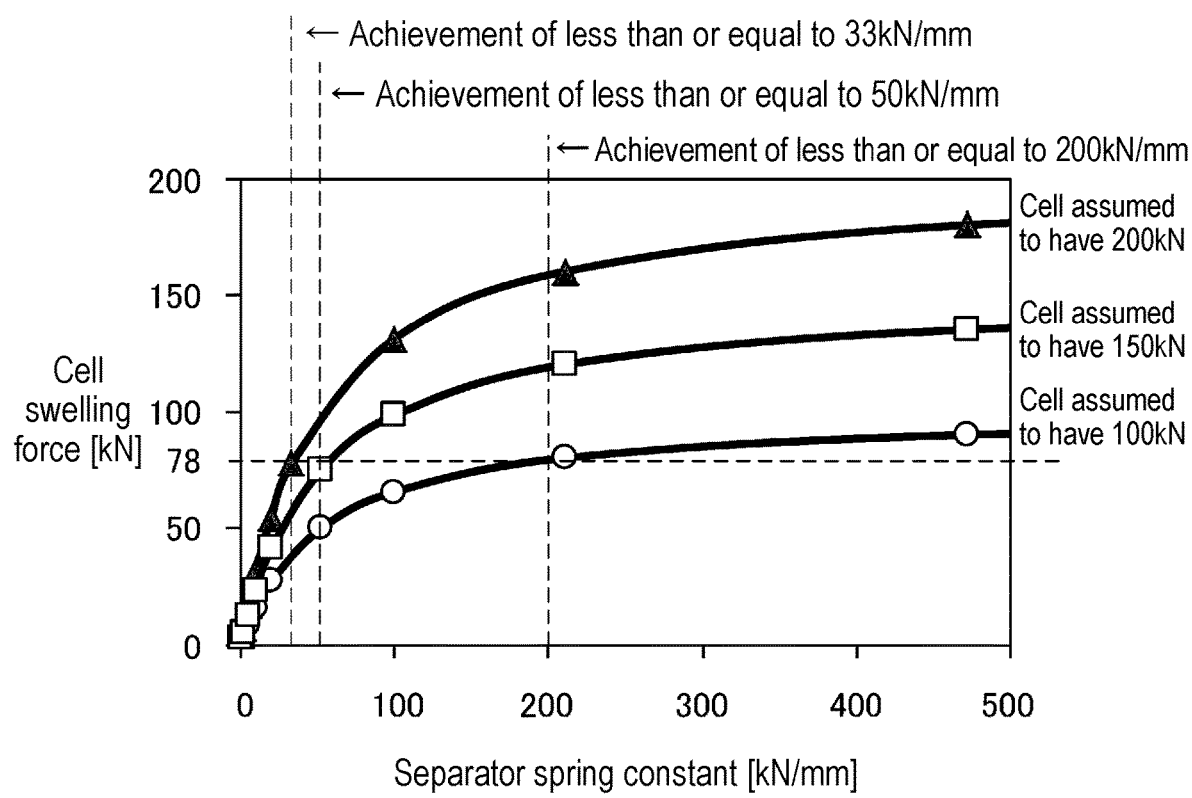
FIG. 13 is a graph illustrating a relationship between a separator spring constant and a cell swelling force.

Here, the relationship between the separator spring constant and the cell swelling force when the secondary battery cells have the cell swelling forces of 100 kN, 150 kN, and 200 kN is illustrated in a graph in FIG. 13. As described above, since the load bearing capacity of 78 kN can be achieved with the bind bar of 1 mm and the end plate of 20 mm, the load bearing capacity in a range below 78 kN in a vertical axis of the graph in FIG. 13 can cope with the cell swelling force.

Thus, the spring constant required for the separator can be less than or equal to 200 kN/mm when the cell swelling force is 100 kN. When the cell swelling force is 150 kN, the separator spring constant can be less than or equal to 50 kN/mm, and when the cell swelling force is 200 kN, the separator spring constant can be less than or equal to 33 kN/mm.

From the above, it has been found that various cell swelling forces ranging from 100 kN to 200 kN inclusive can be coped with by setting the spring constant of the separator for dispersing the cell swelling force (separator spring constant for swelling force dispersion) to less than or equal to 200 kN/mm.

The separator that achieves such a spring constant is preferably a rubber elastic body or a spring elastic body. The thickness of the separator is preferably less than or equal to 10 mm. As a result, a compressible amount can be increased to cope with an increase in the cell swelling amount. More preferably, the thickness of the separator is from 4 mm to 6 mm inclusive.

As a material of the separator that achieves the above spring constant, an elastomer can be used. Such a separator promotes exhibition of the heat insulating property and the heat resistance and facilitate the adjustment of the spring constant. Specifically, foamed urethane, elastomer, or the like can be suitably used. In particular, urethane is preferable because of being easy to adjust the strength. Further, the separator may be made of silicone.

As described above, by setting the spring constant of the separator to less than or equal to 500 kN/mm, it is possible to effectively disperse the swelling force of the secondary battery cells and to cope with the swelling force after dispersion in a wide range, and it is possible to provide a power supply device capable of coping with a fluctuation in the swelling force caused by the increase in the capacity of the secondary battery cells. It is also possible to obtain the dispersion of the swelling force corresponding to the plate thickness of the separator, that is, the strength.

In addition, allowing the swelling of the secondary battery cells to some extent improves of an electrolyte solution circulation in which an electrolyte solution spreads all over the electrode inside the cells, and leads to improvement of cell performance and prevention of degradation. That is, if the electrolyte solution does not uniformly spread all over the electrode, ions do not uniformly move, which leads to Li deposition, resistance increase, and the like. In particular, when cell swelling is suppressed with a hard separator, the electrolyte solution does not spread well all over the electrode and becomes ununiform, which is disadvantageous in terms of the cell performance. By restraining the secondary battery cells with the flexible and soft separator according to the present exemplary embodiment, it is possible to avoid a situation in which the electrolyte solution is hindered from spreading throughout, and to improve the cell performance and prevent degradation. Since the swelling of the secondary battery cells is absorbed by the separator, stress concentration on the fastening member between the cells can be prevented. Furthermore, since the swelling force is reduced, the deformation amount of the end plate is reduced, and stress concentration on a fixing point of the battery stack can be prevented. In addition, since the swelling force of the secondary battery cells and the necessary weight (cross-sectional area) of the structural member are in a proportional relationship, it is possible to cope with the cell swelling force of less than or equal to 200 kN, which greatly contributes to improvement of a weight energy density.

As described above, allowing the swelling of the secondary battery cells improves the electrolyte solution circulation inside the cells, and leads to improvement of the cell performance and prevention of the degradation. Since the cell swelling is absorbed by the separator, stress concentration on the bus bar connecting the cells can be prevented. Furthermore, since the swelling force is reduced, the deformation amount of the end plate is reduced, and the stress concentration on the fixing point fixing the battery stack can be prevented.

Second Exemplary Embodiment

The rigidity and the spring constant of the separator may be made uniform all over a main surface in contact with the secondary battery cell, or may be partially changed. Such an example is illustrated as power supply device 200 according to a second exemplary embodiment in a schematic enlarged sectional view in FIG. 14. Power supply device 200 illustrated in this drawing is similar to the power supply device according to the first exemplary embodiment except for separator 16B, and the same members are denoted by the same reference marks, and detailed description thereof is omitted.

Figure 15:
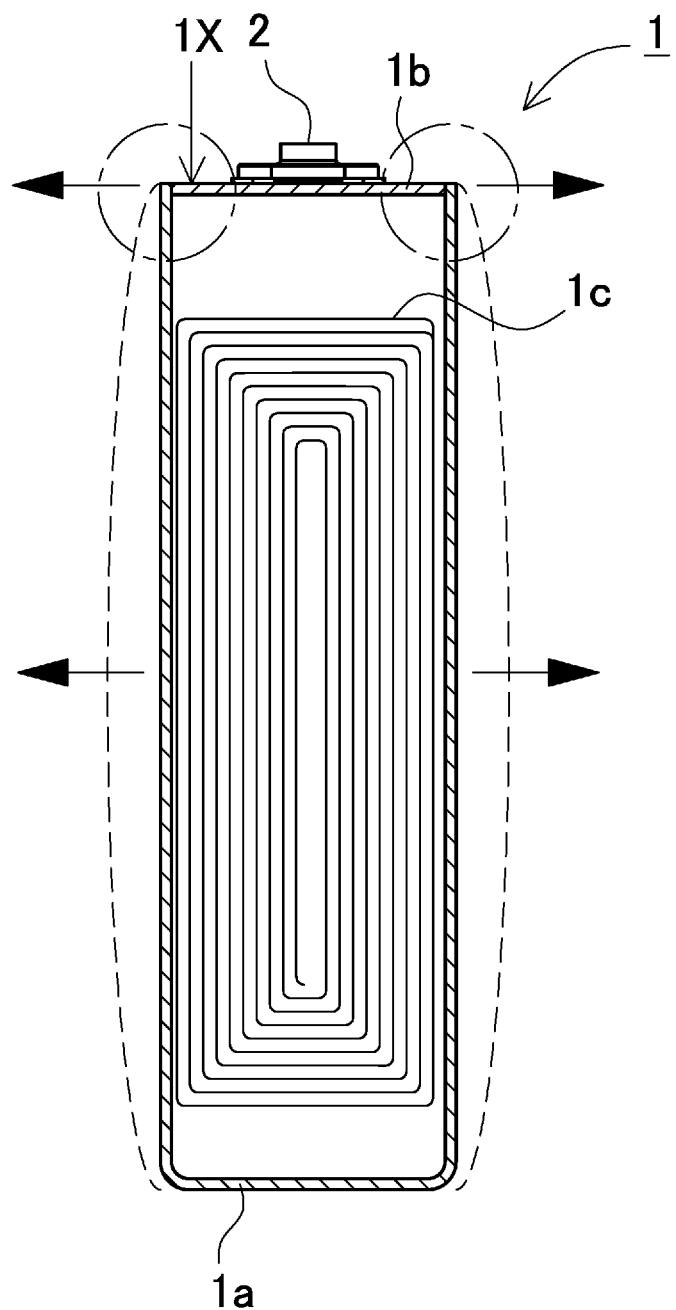
FIG. 15 is a schematic sectional view illustrating how a secondary battery cell expands.

As illustrated in a schematic sectional view in FIG. 15, secondary battery cell 1 generally includes outer covering can 1a having one opening, and sealing plate 1b that closes the opening of outer covering can 1a. In sealing plate 1b, an opening end of outer covering can 1a is welded by laser light or the like. Electrode assembly 1c in which a positive electrode and a negative electrode are wound with a microporous membrane interposed therebetween is provided in outer covering can 1a. In secondary battery cell 1 having such a configuration, when electrode assembly 1c inside expands due to rapid charging and discharging, outer covering can 1a expands as indicated by a broken line in FIG. 15. As a result, it is considered that the opening end of outer covering can 1a is deformed to be expanded, and a welded part between the opening end of outer covering can 1a and sealing plate 1b indicated by a one-dot chain line in the drawing is broken.

Thus, in power supply device 200 according to the second exemplary embodiment, as described above, the rigidity of separator 16B is not uniform but ununiform such that the hardness of one side of secondary battery cell 1, specifically, a side closer to sealing plate 1b is higher than the hardness of the other end of secondary battery cell 1. In other words, the separator spring constant is suppressed on the side closer to sealing plate 1b. In this way, the hardness of the region in contact with sealing plate 1b is increased to suppress a deformation amount while separator 16B has a spring property. It is therefore possible to suppress a situation in which outer covering can 1a is deformed during cell expansion and the welded part with sealing plate 1b is separated.

Figure 14:
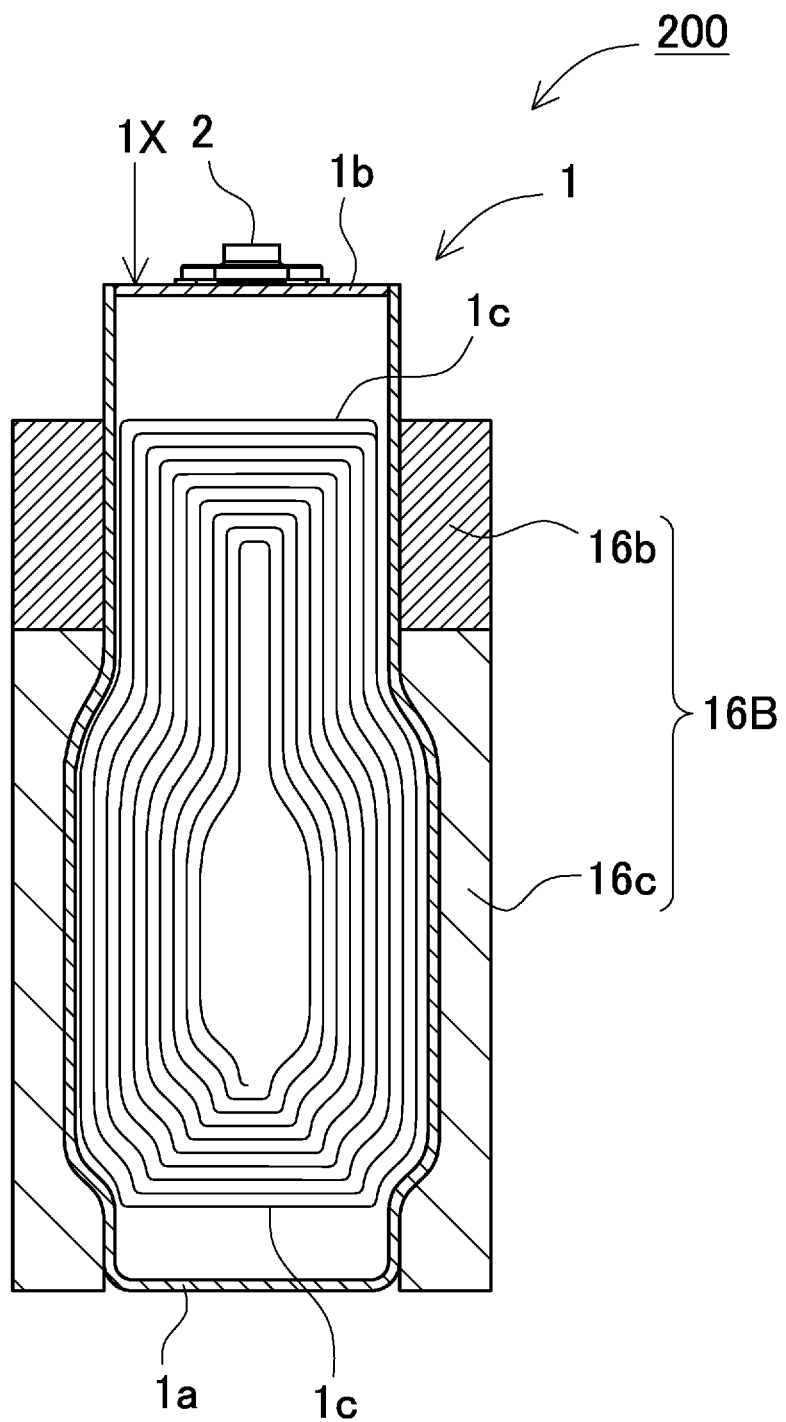
FIG. 14 is a schematic enlarged sectional view of a power supply device according to a second exemplary embodiment.

In the example in FIG. 14, high hardness region 16b is provided at an upper end of separator 16B, that is, on the side closer to sealing plate 1b. High hardness region 16b has higher hardness than another region 16c. For example, the spring constant of high strength region 16b is increased to seven times or more as compared with the spring constant of non another region 16c per unit area. High hardness region 16b and another region 16c may be integrally formed or may be separate members. A boundary between high hardness region 16b and another region 16c is made clear, and in particular, in a case of integral molding, a hardness difference may be gradually decreased so as to gradually change. A width of high hardness region 16b ranges, for example, from about 5% to 15% of a total length of separator 16B from the upper end of separator 16B. As illustrated in FIG. 14, electrode assembly 1c may be provided corresponding to a region where electrode assembly 1c is present inside outer covering can 1a of secondary battery cell 1. That is, by providing high hardness region 16b at a position corresponding to an upper end of electrode assembly 1c, it is possible to easily exert a stress against the expansion of electrode assembly 1c.

The power supply device described above can be used as an automotive power source that supplies electric power to a motor used to cause an electric vehicle to travel. As an electric vehicle equipped with the power supply device, an electric vehicle such as a hybrid car or a plug-in hybrid car that travels by both an engine and a motor, or an electric automobile that travels only by a motor can be used, and the power supply device is used as a power source for these vehicles. Note that, in order to obtain electric power for driving an electric vehicle, an example of constructing a large-capacity and high-output power supply device will be described below in which a large number of the above-described power supply devices are connected in series or in parallel, and a necessary controlling circuit is added.

(Power Supply Device for Hybrid Vehicle)

Figure 16:
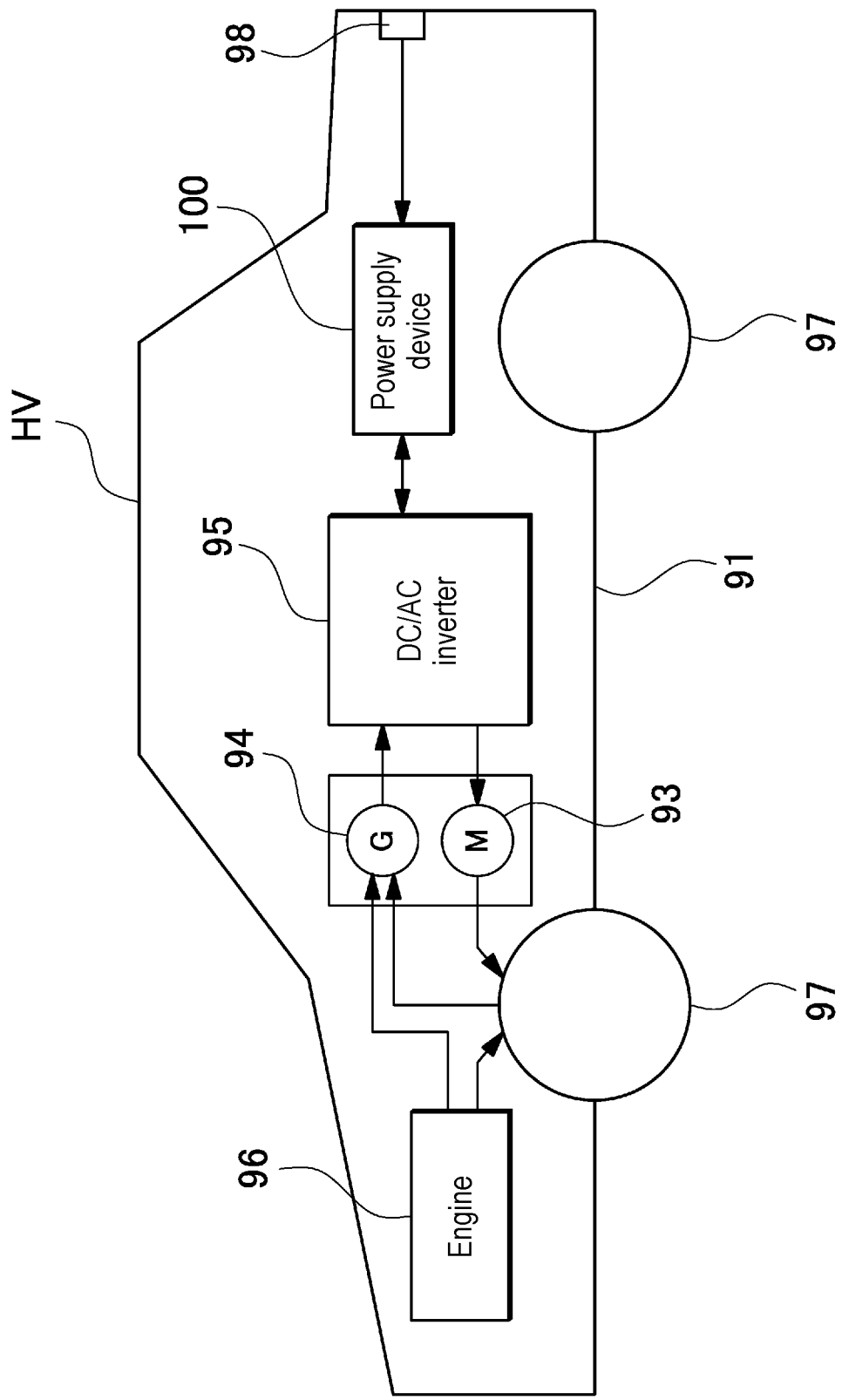
FIG. 16 is a block diagram illustrating an example in which the power supply device is mounted on a hybrid vehicle that travels with an engine and a motor.

FIG. 16 illustrates an example in which power supply device 100 is mounted on a hybrid automobile that travels with both an engine and a motor. Vehicle HV equipped with power supply device 100 shown in this drawing includes vehicle body 91, engine 96 and motor 93 for traveling that cause vehicle body 91 to travel, wheels 97 that are driven by engine 96 and motor 93 for traveling, power supply device 100 that supplies electric power to motor 93, and power generator 94 that charges the battery of power supply device 100. Power supply device 100 is connected to motor 93 and power generator 94 via DC/AC inverter 95. Vehicle HV travels using both motor 93 and engine 96 while charging and discharging the battery of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or driven by regenerative braking acquired when braking is applied to the vehicle and charges the battery of power supply device 100. As illustrated in FIG. 16, vehicle HV may include charging plug 98 for charging power supply device 100. Connecting charging plug 98 to an external power source enables charging of power supply device 100.

(Power Supply Device for Electric Automobile)

Figure 17:
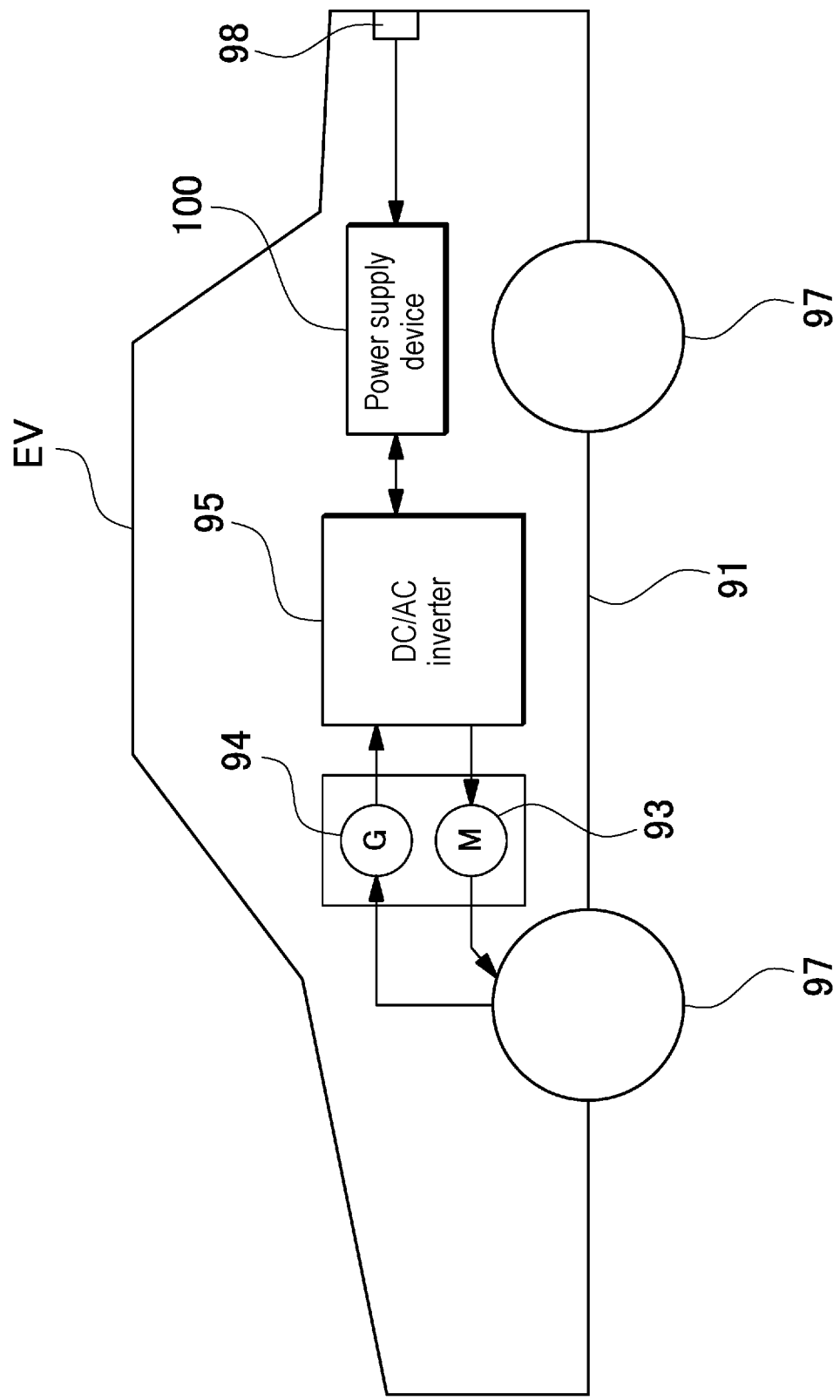
FIG. 17 is a block diagram illustrating an example in which the power supply device is mounted on an electric automobile that travels only with a motor.

FIG. 17 shows an example in which power supply device 100 is mounted on an electric automobile that travels only with a motor. Vehicle EV equipped with power supply device 100 shown in this drawing includes vehicle body 91, motor 93 for traveling that causes vehicle body 91 to travel, wheels 97 that are driven by motor 93, power supply device 100 that supplies electric power to motor 93, and power generator 94 that charges the battery of power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV and charges the battery of power supply device 100. Vehicle EV includes charging plug 98, and power supply device 100 can be charged by connecting charging plug 98 to the external power source.

(Power Supply Device for Power Storage Device)

Figure 18:
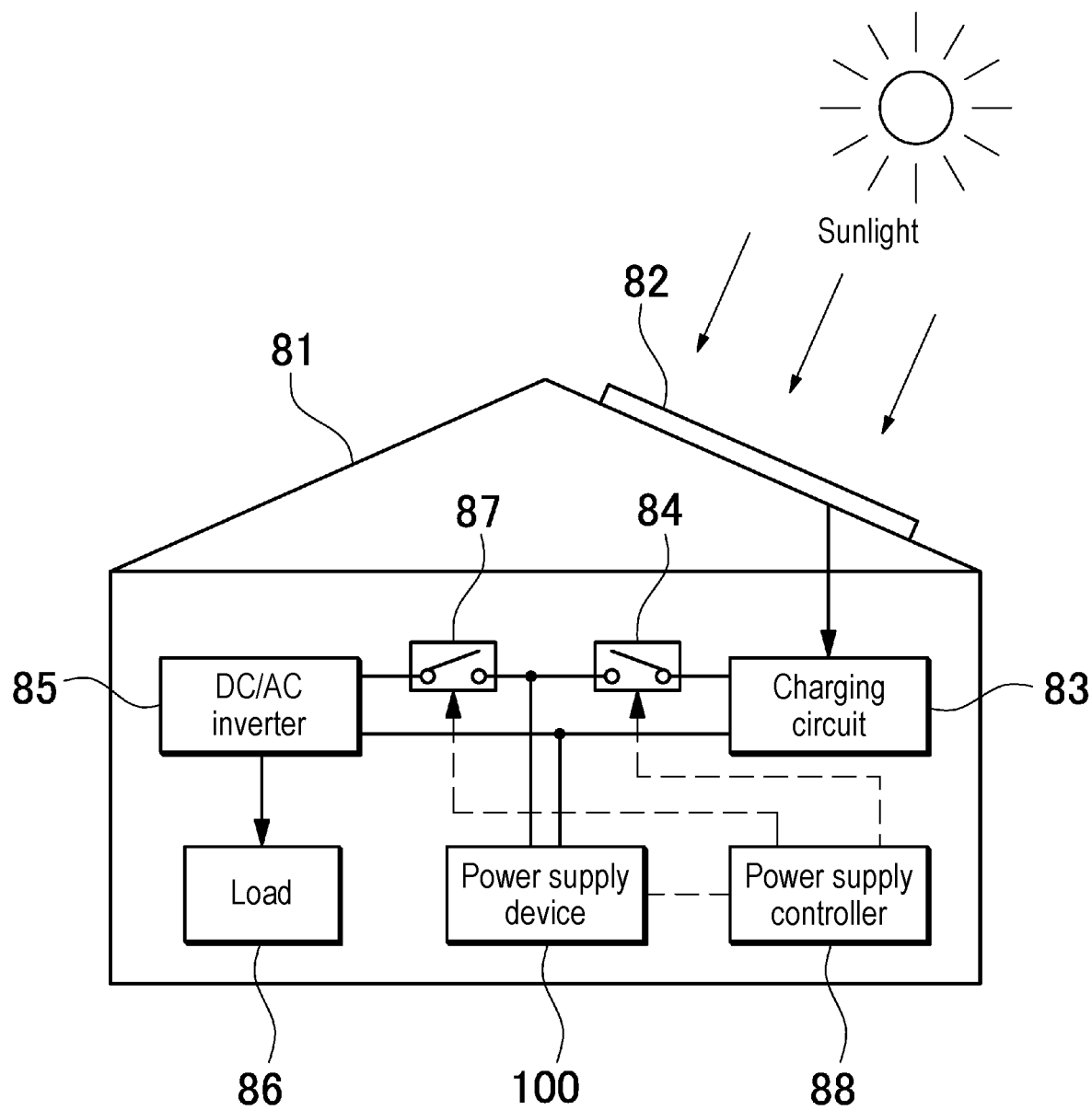
FIG. 18 is a block diagram illustrating an example of applying a power supply device for power storage.

Further, the present invention does not limit the application of the power supply device to a power source for a motor that causes a vehicle to travel. The power supply device according to the exemplary embodiment can be used as a power source for a power storage device that performs power storage by charging a battery with electric power generated by solar power generation, wind power generation, or other methods. FIG. 18 shows a power storage device that performs power storage by charging the battery of power supply device 100 with solar battery 82.

The power storage device shown in FIG. 18 charges the battery of power supply device 100 with electric power generated by solar battery 82 that is disposed, for example, on a roof or a rooftop of building 81 such as a house or a factory. This power storage device charges the battery of power supply device 100 via charging circuit 83 using solar battery 82 as a charging power source, and then supplies electric power to load 86 via DC/AC inverter 85. Thus, this power storage device includes a charge mode and a discharge mode. In the power storage device shown in the drawing, DC/AC inverter 85 is connected to power supply device 100 via discharging switch 87 and charging circuit 83 is connected to power supply device 100 via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. When necessary, power supply controller 88 can supply electric power to load 86 and charge power supply device 100 simultaneously by turning on charging switch 84 and turning on discharging switch 87.

Although not shown, the power supply device can also be used as a power source of a power storage device that performs power storage by charging a battery using midnight electric power at night. The power supply device that is charged with midnight electric power is charged with the midnight electric power that is surplus electric power generated by a power station, and outputs the electric power during the daytime when an electric power load increases, which can limit peak electric power during the daytime to a small value. The power supply device can also be used as a power source charged with both output of a solar battery and the midnight electric power. This power supply device can efficiently perform power storage using both electric power generated by the solar battery and the midnight electric power effectively in consideration of weather and electric power consumption.

The power storage system as described above can be suitably used in applications including a backup power supply device that can be mounted on a computer server rack, a backup power supply device for wireless base stations for cellular phones and the like, a power storage device combined with a solar battery such as a power storage power source for homes and factories or a power source for street lights, and a backup power supply for traffic lights and traffic indicators on roads.

INDUSTRIAL APPLICABILITY

The power supply device according to the present invention can be suitably used as a power source for a large current used for a power source of a motor for driving an electric vehicle such as a hybrid vehicle, a fuel battery automobile, an electric automobile, or an electric motorcycle. Examples of the power supply device include a power supply device for a plug-in hybrid electric automobile and a hybrid electric automobile that can switch between an EV traveling mode and an HEV traveling mode, an electric automobile, or the like. The power supply device can also be appropriately used for the applications including a backup power supply device that can be mounted on a computer sever rack, a backup power supply device for wireless base stations of cellular phones and the like, a power storage device combined with a solar battery such as a power storage power source for homes and factories or a power source for street lights, and a backup power source for traffic lights.

REFERENCE MARKS IN THE DRAWINGS 100, 200: power supply device
1, 1B: secondary battery cell
1X: terminal surface
1a: outer covering can
1b: sealing plate
1c: electrode assembly
2: electrode terminal
10: battery stack
15: fastening member
15a: fastening main surface
15d: bent piece
15f: bolt
16, 16B: separator
16b: high hardness region
16c: another region
17: end face separator
20: end plate
30: insulating sheet
31: flat plate
32: bent cover
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
900: power supply device
901: secondary battery cell
902: spacer
903: end plate
904: bind bar
HV, EV: vehicle

The invention claimed is:

1. A power supply device comprising:
a plurality of secondary battery cells each including an outer covering can including a quadrangular shape;
a plurality of separators each interposed between a corresponding pair of adjacent secondary battery cells among the plurality of secondary battery cells;
a pair of end plates covering both end faces of a battery stack in which the plurality of secondary battery cells are stacked with the plurality of separators; and
a plurality of fastening members each including a plate shape extending in a stacking direction of the plurality of secondary battery cells, and disposed on opposing side surfaces of the battery stack to fasten the pair of end plates to each other,
wherein each of the plurality of separators includes a spring constant of less than or equal to 500 kN/mm,
wherein each of the plurality of secondary battery cells includes a spring constant ranging from 50 kN/mm to 100 kN/mm inclusive, and
wherein each of the plurality of secondary battery cells includes a swelling force ranging from 100 kN to 200 kN inclusive.

2. The power supply device according to claim 1, wherein each of the plurality of separators includes an elastic body.

3. The power supply device according to claim 2, wherein the each of the plurality of separators is a rubber elastic body or a spring elastic body.

4. The power supply device according to claim 1, wherein each of the plurality of separators is an elastomer.

5. The power supply device according to claim 1, wherein each of the plurality of separators includes urethane or silicone.

6. The power supply device according to claim 1, wherein each of the plurality of separators includes a thickness of less than or equal to 10 mm.

7. The power supply device according to claim 1, wherein each of the plurality of fastening members includes a plate thickness of less than or equal to 2.8 mm.

8. The power supply device according to claim 1, wherein each of the plurality of secondary battery cells includes the outer covering can including an opening at one end of the outer covering can and a sealing plate that closes the opening of the outer covering can, and
the each of the plurality of separators includes a region facing the sealing plate of the each of the plurality of secondary battery cells, the region including higher hardness than another region.

9. A vehicle comprising the power supply device according to claim 1, the vehicle comprising:
the power supply device;
a motor for traveling supplied with electric power from the power supply device;
a vehicle body equipped with the power supply device and the motor; and
a wheel that is driven by the motor to cause the vehicle body to travel.

10. A power storage device comprising the power supply device according to claim 1, the power storage device comprising:
the power supply device; and
a power supply controller that controls charging and discharging of the power supply device, wherein the power supply controller allows the plurality of secondary battery cells to be charged with electric power from an outside and performs control charging the plurality of secondary battery cells.

* * * * *